UNITED STATES PATENT OFFICE.

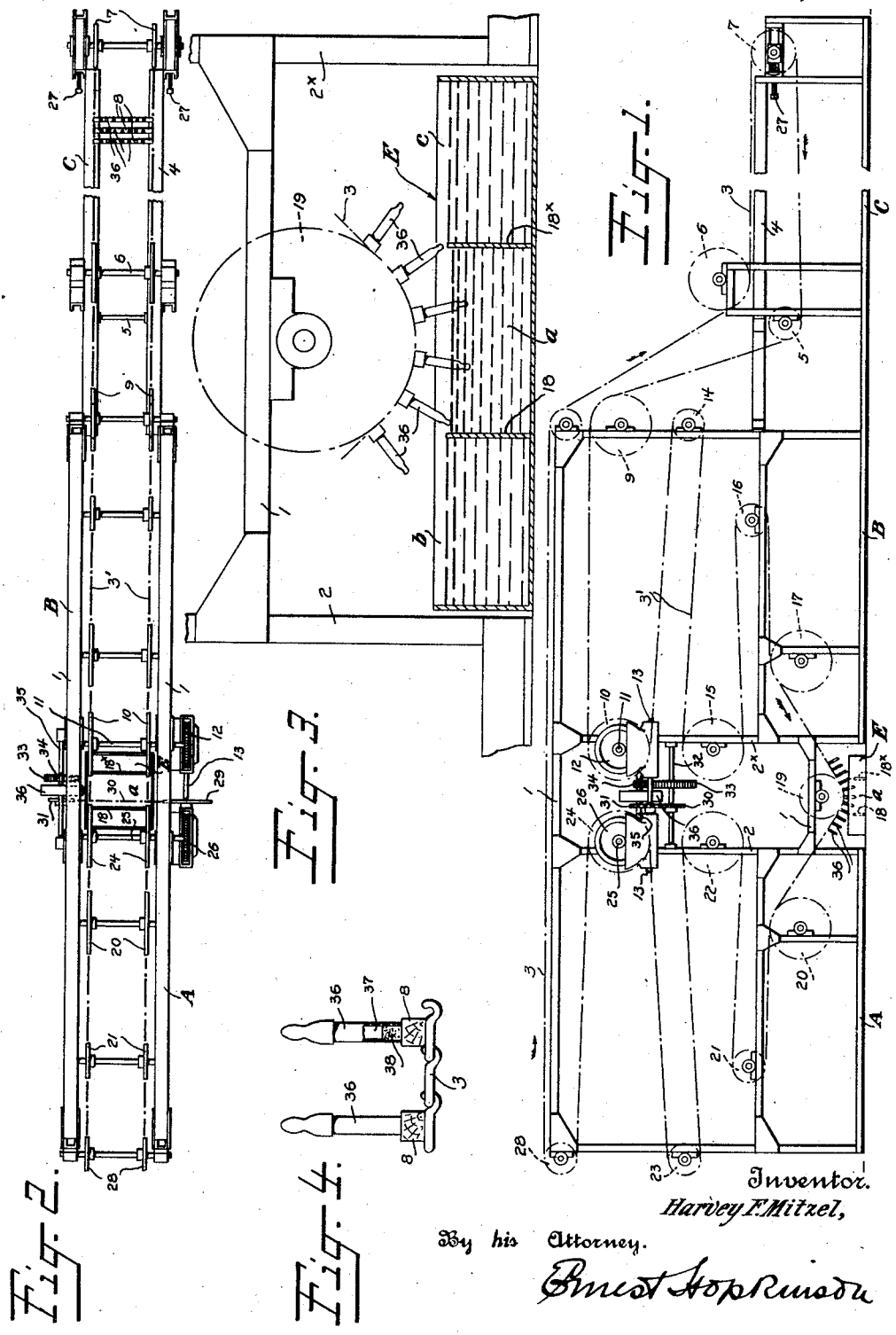

HARVEY F. MITZEL, OF PROVIDENCE, RHODE ISLAND, ASSIGNOR TO REVERE RUBBER COMPANY, A CORPORATION OF RHODE ISLAND.

DIPPING APPARATUS FOR PRODUCING RUBBER ARTICLES.

1,365,528.          Specification of Letters Patent.      Patented Jan. 11, 1921.

Application filed February 19, 1918. Serial No. 218,066.

*To all whom it may concern:*

Be it known that I, HARVEY F. MITZEL, a citizen of the United States, residing in the city of Providence, county of Providence, State of Rhode Island, have invented certain new and useful Improvements in Dipping Apparatus for Producing Rubber Articles, of which the following is a full, clear, and exact description.

This invention relates to apparatus for forming articles of rubber and similar materials by a process which comprises successively dipping forms into a rubber solution and drying the coating, the operation being repeated until a layer of rubber of sufficient thickness has been obtained.

The object of my invention is to provide an improved apparatus for carrying out this process, the improvements residing in the arrangement of a movable support or conveyer for the forms; the manner in which the forms may be secured to the conveyer; and the form of the dipping tank.

The invention will be understood by reference to the accompanying drawings, in which:

Figure 1 is a view of the apparatus in elevation, the conveyer being indicated by dot and dash lines;

Fig. 2 is a plan view of the apparatus;

Fig. 3 is a sectional detail in elevation illustrating the dipping tank and its relation to the conveyer;

Fig. 4 is a detail in elevation of a portion of the conveyer, illustrating the manner in which the forms are carried.

The apparatus comprises three units A, B, C, each consisting of a frame work which supports a series of feed rollers or idlers for guiding the conveyer 3 in a circuitous path. The frame members of units A, B, are rigidly connected by beams 1 which serve to separate the risers 2, 2ˣ, and intermediate the said risers is located the driving mechanism for conveyer 3. The unit C of the frame supports a table 4 and a series of idler rollers 5, 6 and 7.

The conveyer 3, which comprises two endless chains 3', connected by means of the form strips 8, passes under idler rollers 6, over table 4, over idler rollers 7 and thence to idler rollers 5 from which point the conveyer leads into a circuitous path through frame unit B in the following manner: The conveyer passes over a set of idler rollers 9 and thence over a set of drive wheels 10 which are mounted upon a power-driven shaft 11, the latter carrying worm wheel 12, in mesh with a worm (not shown) on shaft 13. The conveyer thence leads to a set of idler rollers 14, thence to an opposite set of idler rollers 15, thence to a set of idler rollers 16, and thence to a set of idler rollers 17. From the idler rollers 17, the conveyer 3 leaves unit B of the machine and comes into register with a dipping tank E. By reference to Fig. 1, it will be seen that the form strips 8 are inverted when they are brought into register with tank E so that the forms carried by the strips project within the solution in the tank.

One object of my invention is to prevent the drippings from the forms passing into that portion of the tank which receives the forms, so that the latter may travel in undisturbed solution, thereby avoiding air bubbles, caused by the drops of solution from the forms, which would blister the coatings. To this end the tank E is provided with the partitions 18, 18ˣ which separate the dipping chamber $a$ of the tank from the dripping chambers $b$, $c$. In its movement to carry the forms into the dipping chamber $a$ of the tank, the conveyer 3 passes under a set of idler rollers 19, and these idler rollers are so proportioned to the dipping chamber $a$ that the forms upon their emergence from the tank are immediately brought beyond partition 18 or 18ˣ (according to the direction of movement of the conveyer) and the drippings from the forms pass into dripping chamber $b$ or $c$ without disturbing the contents of the dipping chamber.

Any suitable means may be provided for maintaining a constant level of rubber solution in the dipping chamber $a$ and for carrying off the contents of dripping chambers $b$ and $c$; and obviously the tranquil portion of the solution in the dripping chambers may be passed into the dipping chamber, as, for example, through apertures in the partitions 18, 18ˣ, near the base of each partition.

The conveyer is carried through unit A of the machine in the same circuitous manner as that employed for its passage through unit B. After passing into register with the dipping tank E, the conveyer meets idlers 20 and thence passes over a set of idlers 21, and successively over sets of idlers, 22 and 23, and in such manner that the forms are successively inverted and reverted. After leaving the idler rollers 23, the conveyer passes over driving rollers 24 on a shaft 25, which shaft carries a worm wheel 26 driven by a worm (not shown) on worm shaft 13. The conveyer thence passes over a set of rollers 28 and thence from end to end of the machine back to the set of idler rollers 6 above table 4.

The worm shaft 13 carries a sprocket wheel 29 (Fig. 2) connected by means of chain 30 with a second sprocket wheel 31 on a shaft 32 which is rotated by means of the intermeshing gears 33, 34, the latter being mounted upon a pulley shaft 35 carrying a pulley 36 for belt connection with any suitable source of power.

The form strips 8 illustrated in the accompanying drawings are adapted to support the nipple forms 36, the latter being provided with sockets 37 to receive the yielding means of fastening between the form and strip, which, in this instance, comprises a cork post 38.

In operation, the forms are placed upon the form strips as the conveyer slowly moves over the table 4. The forms upon their emergence from the dipping tank move in a circuitous path through unit A of the machine and in such manner that the forms are alternately inverted and reverted to overcome any tendency of the solution to flow downward and mass at an end of the form. After leaving unit A of the machine, the forms again pass over table 4 where they may be inspected, and, if covered by a desired thickness of the solution, removed from the form strip. But if a second dipping is required, the drying of the film of each form is continued by the passage of the conveyer through a circuitous path in unit B of the machine, thence again into the dipping tank.

The direction of movement of the conveyer over table 4 may be reversed whenever desired by reversing the rotation of pulley 36.

By providing two units of guiding idler rollers and by disposing the dipping tank intermediate the units, the conveyer may be given an adequate length of movement for the drying of the coating on the forms and at the same time the distance opposite rollers of a unit may be made sufficiently short to prevent the sagging of the conveyer and to permit the forms to be inverted at the time the coating tends to become substantially affected by gravity. Rollers 7 are provided with take up devices 27 by means of which any desired tension may be given to the conveyer.

Having thus described my invention, what I claim as new and desire to protect by Letters Patent is:

1. A dipping and drying apparatus for the production of rubber articles comprising an endless movable support on which dipping forms may be carried, and a tank for rubber solution comprising a dipping chamber and a dripping chamber for the said forms.

2. A dipping and drying apparatus for the production of rubber articles comprising a tank for rubber solution, dipping forms, a movable support on which the dipping forms are carried, means whereby the said support may be moved in a zig-zag path to successively invert and revert the forms, and a table over which the movable support is passed.

3. A dipping and drying apparatus for the production of rubber articles, comprising a movable support, means whereby the said support may be moved in a zag-zag path to successively invert and revert a face thereof, means carried by said face for rigidly holding dipping forms, a tank adapted to hold a dipping solution and into register with which the support is moved, and a table over which the support passes.

4. A dipping and drying apparatus for the production of rubber articles, comprising a tank for rubber solution, dipping forms, a movable support on which the dipping forms are carried, and means whereby the said support may be moved in a zig-zag path to successively invert and revert the forms.

5. A dipping and drying apparatus for the production of rubber articles comprising a tank for rubber solution, an endless movable support and means for moving the same into register with the tank, a cylindrical post formed of yielding material carried by the support, and a form having a socket adapted to receive said yielding post, whereby the form is frictionally held upon the support.

6. A dipping and drying apparatus for the production of rubber articles, comprising a dipping tank, a flexible support, means for flexing the support in a zig-zag path, dipping forms rigidly secured to said support, and means for moving the support in said path and into register with the tank.

7. A dipping apparatus comprising a movable support on which dipping forms may be carried, and a tank in the path of the support comprising a dipping chamber and a dripping chamber for the said forms.

8. A dipping apparatus comprising a movable support on which dipping forms may be carried, a tank for containing liquid in the path of the support comprising a dipping chamber and a dripping chamber for the said forms, and means for maintaining the height of liquid in the dipping chamber substantially uniform.

9. A dipping apparatus comprising a movable support on which dipping forms may be carried, and a tank in the path of the support comprising a dipping chamber and a dripping chamber for the said forms, said chambers being in communication near their bottoms.

10. A dipping apparatus comprising a movable support on which dipping forms may be carried, a tank for containing liquid in the path of the support comprising a dipping chamber and a dripping chamber for said forms, said chambers being in communication near their bottoms, and means for maintaining the height of liquid in the dipping chamber substantially uniform.

11. A dipping and drying apparatus for making dipped rubber articles, comprising a tank for rubber solution, means for successively dipping a plurality of forms in the solution, and means for preventing the deposition on the dipped forms of bubbles formed by the drip.

12. A dipping and drying apparatus for making dipped rubber articles, comprising a tank for rubber solution, means for successively dipping a plurality of forms in the solution, and means for segregating that portion of the surface of the solution into which the forms dip from the remainder of said surface.

13. A dipping and drying apparatus for making dipped rubber articles, comprising a tank for rubber solution, means for successively passing a series of forms into and out of the solution, and means for localizing the bubbles, caused by the drip from the forms as they emerge, out of the path of the immersed forms.

Signed at Providence, Rhode Island, this 15th day of February, 1917.

HARVEY F. MITZEL.